United States Patent [19]
Rieck et al.

[11] Patent Number: 5,491,211
[45] Date of Patent: Feb. 13, 1996

[54] BLOOM-FREE THERMOPLASTIC POLYURETHANE COMPOSITIONS

[75] Inventors: James N. Rieck, Wheeling; Joseph M. Jupa, New Martinsville, both of W. Va.

[73] Assignee: Bayer Corporation, Pittsburgh, Pa.

[21] Appl. No.: 259,606

[22] Filed: Jun. 14, 1994

[51] Int. Cl.⁶ .................................................. C08G 18/30
[52] U.S. Cl. .............................. 528/60; 528/65; 528/66; 528/272
[58] Field of Search ................................. 528/60, 65, 66, 528/272

[56] References Cited

U.S. PATENT DOCUMENTS 4,393,186  7/1983  Damico et al. ........................... 528/49

FOREIGN PATENT DOCUMENTS 386974   9/1990  European Pat. Off. .
2626132  12/1977  Germany .
3230009   3/1983  Germany .

*Primary Examiner*—James J. Seidleck
*Assistant Examiner*—Duc Truong
*Attorney, Agent, or Firm*—Joseph C. Gil; Lyndanne M. Whalen

[57] ABSTRACT

Blooming in certain thermoplastic polyurethane products is substantially or completely eliminated by including a chain terminator. More specifically, at least one hydroxy functional polyester polyol having a molecular weight of at least 500 and a hydroxyl functionality of at least 2, a chain extender and an organic diisocyanate are combined with a chain terminator. The chain terminator which is preferably a monofunctional compound that is reactive with an isocyanate. These reactants are used in amounts such that the of NCO/H index of the formulation is at or near 100.

16 Claims, No Drawings

BLOOM-FREE THERMOPLASTIC POLYURETHANE COMPOSITIONS

BACKGROUND OF THE INVENTION

The present invention relates to thermoplastic polyurethane resins characterized by reduced or eliminated surface haze (blooming).

The phenomenon of "blooming" which is also referred to as "surface haze" in the context of articles molded of polyurethane resins has long been recognized in the art. The degree of blooming and the effectiveness of corrective methods are determined by observation. One technique for determining the degree of blooming is to extrude the polyurethane composition to form a strand and then monitor the surface haze of that strand over a period of several days. The development of haze, the time in which development of the haze occurs and the extent of the haze enable the skilled artisan to distinguish between compositions on the basis of their susceptibility to blooming.

Products such as elastomers, thermoplastically molded articles and textile coatings are known to develop this surface imperfection and means for alleviating this problem have long been sought. The products that are most susceptible to blooming are those composed of polyester polyols, a short chain diol, and MDI (diphenylmethane diisocyanate).

SUMMARY OF THE INVENTION

It is an object of the present invention to provide a method for preparing a thermoplastic polyurethane composition which is virtually free of surface haze.

It is also an object of the invention to provide polyurethane compositions which are virtually free of surface haze.

These and other objects which will be apparent to those skilled in the art are accomplished by reacting (a) at least one hydroxy functional polyester polyol having a molecular weight of at least 500 and a hydroxyl functionality of at least 2, (b) a chain extender, and (c) an organic diisocyanate. A chain terminator (d) which is preferably a monofunctional compound that is reactive with isocyanate groups is also included in the reaction mixture in an amount such that the NCO/H index of the reaction mixture (i.e., the ratio of equivalents of isocyanate groups to the isocyanate-reactive groups of (a)+(b)+(d)×100) is at or near 100 (i.e., 100±5).

DETAILED DESCRIPTION OF THE INVENTION

The products that are most susceptible to blooming are those which are produced by reacting polyester polyols, a short chain diol, and a diisocyanate. The present invention is based upon the finding that the addition of a chain terminator, preferably a monofunctional compound containing a group which is reactive with an isocyanate, most preferably a monofunctional alcohol, to the reaction mixture from which a polyurethane susceptible to blooming is produced lowers the melting range of the polymer and reduces the tendency of the resin to bloom.

The process of the present invention yields polyurethane products characterized by significantly reduced or totally eliminated blooming. These improved properties are achieved by including a sufficient amount of at least one chain terminator in the reaction mixture which includes a diisocyanate, a chain extender and a polyester polyol which is preferably an adipic acid-based polyester polyol. It is important that the ratio of isocyanate groups to isocyanate-reactive groups in the reaction mixture (NCO/H) be maintained at or near 1 (i.e., NCO/H index=100±5).

Any of the known diisocyanates may be used in the practice of the present invention. Examples of suitable diisocyanates include: diphenylmethane diisocyanate, dicyclohexylmethane diisocyanate, dicyclohexyl diisocyanate, tolylene diisocyanate and hexamethylene diisocyanate. The preferred diisocyanate is diphenylmethane-4,4'-diisocyanate (MDI) which is well known in the art and readily available in commerce.

Any polyester polyol may be used in the practice of the present invention. The hydroxy functional polyester polyols most suitable for preparing polyurethane resins in accordance with the present invention are those having a molecular weight of at least about 500, preferably from about 500 to about 5000, and a hydroxyl functionality of at least 2, preferably about 2. Polyester polyols which are based on dibasic acids such as adipic acid are particularly preferred. Specific examples of suitable polyester polyols include: polyethylene adipate, polybutylene adipate, polyhexamethylene adipate, and the like. Particularly preferred polyester polyols are adipic acid-based polyester polyols represented by the formula

$$HO-R-O+C-(CH_2)_n-COR'O]_pH \quad (1)$$

in which
R and R' each independently represent the group $(CH_2)_n$
in which
n represents an even integer, preferably 2, 4, 6 or 8 and
p represents the number of repeating [—CO—$(CH_2)_n$—COOR'O] units.

The number p must be such that the polyol will have a molecular weight of at least 500, preferably from about 500 to about 5000. In the most preferred polyol, n represents 4 in each occurrence (i.e., for each of R and R' as well as in the $(CH_2)_n$ group).

Generally, the polyester polyols used in the practice of the present invention are solid at room temperature. It is preferred that the polyester polyol have a melting point of at least 50° C.

Chain extenders useful in the practice of the present invention include those represented by the formula

$$HO-R''-OH \quad (2)$$

in which
R" represents an alkylene radical, preferably an alkylene radical having an even number of carbon atoms.
Specific examples of suitable chain extenders include: 1,4-butanediol, 1,6-hexanediol, and diols which produce crystalline hardblock from the reaction of MDI and the diol. 1,4 butanediol is the preferred chain extender.

Chain terminators useful in the practice of the present invention include any of the monofunctional compounds which are reactive with an isocyanate, provided that any monofunctional alcohol used as chain terminator must be an alkylene alcohol and have at least 14 carbon atoms. Suitable chain terminators include: monofunctional, alkylene alcohols having at least 14 carbon atoms, monoisocyanates, monoamines, and the like. Monofunctional alcohols are preferred.

Suitable monoalcohols are non-aromatic and have a chain length of at least 14, preferably from 14 to 22, most preferably about 18 carbon atoms. The most preferred alcohol is stearyl alcohol (octadecanol). It has been found that monoalcohols having chain lengths below 14 produce polyurethanes with a high degree of blooming. A monoalcohol having a chain length of 14 carbon atoms produces polyurethanes in which blooming occurs to a minor extent. As the chain length of the monoalcohol increases, the extent of blooming in the polyurethane decreases. Polyurethanes made with monoalcohols having chain lengths of 18 or more carbon atoms exhibit essentially no blooming.

The chain terminator is generally used in an amount of from about 0.01 to about 0.15, preferably from about 0.03 to about 0.06, equivalents per equivalent of polyester polyol.

This chain terminator may be included as an original reactant in the polyurethane-forming reaction mixture (i.e., during polyurethane synthesis) or it may be added subsequent to polyurethane synthesis but prior to processing. The thermoplastic polyurethane compositions of the present invention may be processed by any of the known processing techniques such as extrusion, injection molding or transfer molding.

Any of the known additives and processing aids may be included in the polyurethanes produced in accordance with the present invention. Examples of suitable additives include stabilizers, processing aids, fillers and reinforcing agents.

It has been found that the method of processing the thermoplastic polyurethanes of the present invention does not affect haze development. However, the method by which the polyurethane is synthesized does appear to influence the tendency of a resin to bloom. The tendency to bloom is greater in polyurethanes which have been synthesized by the one-shot method. In the one-shot method, all of the reactants are mixed simultaneously and reacted to form the final polyurethane. Less blooming is observed in polyurethanes made by pre-reacting the polyester polyol with isocyanate to form a prepolymer and subsequently reacting the prepolymer with the chain extender to make the polymer.

Having thus described my invention, the following Examples are given as being illustrative thereof. All parts and percentages given in these Examples are parts by weight and percentages by weight, unless otherwise indicated.

EXAMPLE 1

Polybutylene adipate polyol (hydroxyl functionality=2; molecular weight=2000) was thoroughly mixed with 1,4-butanediol in a ratio 100 parts polybutylene adipate polyol to 9.75 parts butanediol. This mixture was heated to 90°–110° C. 39.7 parts of diphenylmethane diisocyanate were added to this heated mixture. (NCO/H index=100) The mixture was then stirred for 15 to 25 seconds, poured into a Teflon polymer-lined tray and cured in an infrared oven for 8 to 10 minutes at 110° C. The resulting solid thermoplastic was ground and tested.

EXAMPLE 2

A polybutylene adipate polyol (hydroxyl functionality=2; molecular weight=2000) was thoroughly mixed with 1,4-butanediol in a ratio of 100 parts polyol to 9.75 parts butanediol. 0.81 parts of stearyl alcohol were added to this mixture. The mixture was then heated to 90°–110° C. and 39.7 parts of diphenylmethane diisocyanate were added. (NCO/H index=100) The heated mixture was stirred for 15 to 25 seconds, poured into a Teflon polymer-lined tray and cured in an infrared oven for 8 to 10 minutes at 110° C. The resulting solid thermoplastic was ground and tested.

EXAMPLE 3

A polybutylene adipate polyol (average hydroxyl number of 56.1; acid number=0.5; functionality of 2; molecular weight=2000) was thoroughly mixed with 1,4-butanediol in a ratio of 100 parts polyol to 9.75 parts butanediol and with 1.96 parts of 1-docosanol. The mixture was heated to 90°–100° C. and 48.2 parts of diphenylmethane diisocyanate (NCO/H index=100) were added, stirred for 15 to 25 seconds, poured into a Teflon polymer-lined tray and cured in an infrared oven for 8 to 10 minutes at 110° C. The resulting solid thermoplastic was ground and tested.

EXAMPLE 4

A polybutylene adipate polyol (average hydroxyl number of 56.1; acid number=0.5; functionality of 2; molecular weight=2000) was thoroughly mixed with 1,4-butanediol in a ratio of 100 parts polyol to 9.75 parts butanediol and 0.78 parts of 1-octanol. The mixture was heated to 90°–100° C. and 48.1 parts of diphenylmethane diisocyanate (NCO/H index=100) were added, stirred for 15 to 25 seconds, poured into a Teflon polymer-lined tray and cured in an infrared oven for 8 to 10 minutes at 110° C. The resulting solid thermoplastic was ground and tested.

EXAMPLE 5

A polybutylene adipate polyol (average hydroxyl number of 56.1; acid number=0.5; functionality=2; molecular weight=2000) was thoroughly mixed with 1,4-butanediol in a ratio of 100 parts polyol to 9.75 parts butanediol and with 1.03 parts of 1-undecanol. The mixture was heated to 90°–100° C. and 48.2 parts of diphenylmethane diisocyanate (NCO/H index=100) were added, stirred for 15 to 25 seconds, poured into a Teflon polymer-lined tray and cured in an infrared oven for 8 to 10 minutes at 110° C. The resulting solid thermoplastic was ground and tested.

EXAMPLE 6

A polybutylene adipate polyol (average hydroxyl number of 56.1; acid number=0.5; functionality=2; molecular weight=2000) was thoroughly mixed with 1,4-butanediol in a ratio of 100 parts of polyol to 9.75 parts butanediol and with 1.29 parts of 1-tetradecanol. The mixture was heated to 90°–100° C. and 48.2 parts of diphenylmethane diisocyanate (NCO/H index=100) were added, stirred for 15 to 25 seconds, poured into a Teflon polymer-lined tray and cured in an infrared oven for 8 to 10 minutes at 110° C. The resulting solid thermoplastic was ground and tested.

The materials prepared in these Examples were used to produce extruded tape (ribbon). The tapes were visually inspected periodically and the formation of haze (blooming) noted.

The table below shows the results of the blooming test on these extruded tapes.

| Example | Monoalcohol | C-Length | Bloom 20 Days Age | Bloom 30 Days Age |
|---|---|---|---|---|
| 1 | none | 0 | heavy | heavy |
| 2 | 1-octanol | 8 | heavy | heavy |
| 3 | 1-undecanol | 11 | heavy | heavy |
| 4 | 1-tetradecanol | 14 | light | light |
| 5 | 1-octadecanol | 18 | none | none |
| 6 | 1-docosanol | 22 | none | none |

EXAMPLE 7

In accordance with the invention, a thermoplastic polyurethane composition was prepared based on 100 parts polybutylene adipate (hydroxyl functionality=2; molecular weight=2000), 9.7 parts 1,4 butylene glycol and 40.13 parts of MDI. (NCO/H index=1.02). 3 equivalent percent of stearyl alcohol were included in one composition (Sample H) and 6 equivalent percent of stearyl alcohol were included in another composition (Sample I).

Portions of the thus-prepared compositions were treated as noted in Table 2 and tapes were extruded to produce test specimens. The melt index of those test specimens was determined in accordance with ASTM D 1238. The melt indices are also reported in Table 2.

The extruded materials were also visually inspected for haze development at regular intervals. The test specimens made from compositions which included stearyl alcohol (18 carbon atoms) did not develop a surface haze. Each of the specimens prepared from the composition which did not include stearyl alcohol did develop a surface haze.

Optional epoxy compound and wax which were included in Samples H and I to facilitate processing did not appear to materially affect the properties of the extruded product.

TABLE 2

| Sample | Description of Treatment | Haze | Melt Index |
|---|---|---|---|
| A | ground; not extruded | yes | 2.0 |
| B | extruded; ground-no vacuum | yes | 2.5 |
| C | extruded; ground-vacuum | yes | 2.7 |
| D | extruded; ground, additives-no vacuum | yes | 5.0 |
| E | extruded; ground, additives-vacuum | yes | 3.1 |
| F | re-extruded pellets of Sample B-no vacuum | yes | 2.4 |
| G | re-extruded pellets of Sample B-vacuum | yes | 2.4 |
| H | contain 3 equivalent % stearyl alcohol includes additives, extruded-no vacuum | no | 13.1 |
| I | contain 6 equivalent % stearyl alcohol includes additives, extruded-no vacuum | no | 39.8 |

The experimental evidence suggests that the blooming phenomenon is independent of the method used to process a composition. The application of vacuum and the incorporation of processing aids also appears to have no effect upon the development of surface haze.

The Melt Index of the extruded samples made from compositions which included a monoalcohol was significantly higher than that of samples made from compositions which did not include such monoalcohols. The increase in Melt Index is directly proportional to the amount of monoalcohol present in the composition being processed.

It is within the skill in the art to practice this invention in numerous modifications and variations in light of the above teachings. It is understood that the various embodiments of this invention described herein may be altered without departing from the spirit and scope of this invention as defined by the following claims.

What is claimed is:

1. A method for reducing blooming in a thermoplastic polyurethane by combining
   (1) at least one hydroxy functional polyester polyol having a molecular weight of at least 500 and a hydroxyl functionality of at least 2,
   (2) a chain extender,
   (3) an organic diisocyanate and
   (4) a chain terminator selected from monofunctional alkylene alcohols having at least 14 carbon atoms, monoisocyanates and monoamines in amounts such that an NCO/H index which is at or near 100 is achieved.

2. The method of claim 1 in which chain extender (2) is a short chain diol.

3. The method of claim 1 in which polyester polyol (1) is used in an amount of about 100 parts by weight and chain extender (2) is used in an amount of about 5 parts by weight.

4. The method of claim 1 in which polyester polyol (1) has a melting temperature of at least about 50° C.

5. The method of claim 1 in which polyester polyol (1) is based on adipic acid.

6. The method of claim 7 in which chain terminator (4) is a monofunctional alcohol.

7. The method of claim 1 in which the chain terminator (4) is a monofunctional alcohol.

8. The method of claim 1 in which diisocyanate (3) is MDI.

9. The method of claim 8 in which chain extender (2) produces crystalline hardblock by reacting with MDI.

10. The method of claim 1 in which chain extender (2) is 1,4-butanediol or 1,6-hexanediol.

11. The method of claim 1 in which polyester polyol (1) is represented by the formula

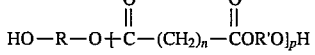

in which
R and R' each independently represent the group $(CH_2)_n$
in which
n represents 2,4 or 6
and
P represents a number of $[-C-(CH_2)_n-COR'O]$ groups sufficient to result in a polyol having a molecular weight of at least 500.

12. The method of claim 11 in which the molecular weight of polyester polyol (1) is from about 500 to about 5000.

13. The method of claim 1 in which chain terminator (4) is stearyl alcohol.

14. The method of claim 1 in which chain terminator (4) is a monoamine.

15. The polyurethane produced by the method of claim 1.

16. The polyurethane produced by the method of claim 6.

* * * * *